(12) United States Patent
Palmer

(10) Patent No.: US 11,487,444 B2
(45) Date of Patent: Nov. 1, 2022

(54) CENTRALIZED POWER MANAGEMENT IN MEMORY DEVICES

(71) Applicant: Micron Technology, Inc., Boise, ID (US)

(72) Inventor: David A. Palmer, Boise, ID (US)

(73) Assignee: MICRON TECHNOLOGY, INC., Boise, ID (US)

(*) Notice: Subject to any disclaimer, the term of this patent is extended or adjusted under 35 U.S.C. 154(b) by 126 days.

(21) Appl. No.: 16/830,134

(22) Filed: Mar. 25, 2020

(65) Prior Publication Data

US 2021/0303184 A1  Sep. 30, 2021

(51) Int. Cl.
*G06F 3/06* (2006.01)
*G06F 1/04* (2006.01)

(52) U.S. Cl.
CPC .............. *G06F 3/0625* (2013.01); *G06F 1/04* (2013.01); *G06F 3/067* (2013.01); *G06F 3/0617* (2013.01); *G06F 3/0653* (2013.01); *G06F 3/0659* (2013.01)

(58) Field of Classification Search
CPC ........ G06F 1/04; G06F 1/3206; G06F 1/3275; G06F 3/0617; G06F 3/0625; G06F 3/0653; G06F 3/0659; G06F 3/067; Y02D 10/00
See application file for complete search history.

(56) References Cited

U.S. PATENT DOCUMENTS

| 2005/0210304 A1* | 9/2005 | Hartung | G06F 3/0634 |
| | | | 713/320 |
| 2019/0065086 A1* | 2/2019 | Margetts | G06F 1/329 |
| 2020/0209944 A1* | 7/2020 | Palmer | G06F 1/3275 |

OTHER PUBLICATIONS

"Open NAND Flash Interface Specification", Revision 4.1, ONFi, Copyright 2005-2017, Intel Corporation, Micron Technology, Inc., Phison Electronics Corp., Western Digitial Corporation, SK Hynix, Inc., Sony Corporation, Dec. 12, 2017, 338 pages.

* cited by examiner

*Primary Examiner* — Terrell S Johnson
(74) *Attorney, Agent, or Firm* — Nicholson De Vos Webster & Elliott LLP

(57) ABSTRACT

A total power requirement for a plurality of memory operations is estimated. It is determined that the total power requirement would meet a power budget. In in response to determining that the total power requirement would meet the power budget, a power profile identifier associated with a first operation of the plurality of memory operations is adjusted. The first operation and the power profile identifier are issued to a memory device. The power profile identifier is used by the memory device to regulate an amount of power used when performing the first operation.

20 Claims, 8 Drawing Sheets

CENTRALIZED POWER MANAGEMENT IN MEMORY DEVICES

TECHNICAL FIELD

The present disclosure generally relates to power management in memory devices, and more specifically, relates to centralized power management of memory devices.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
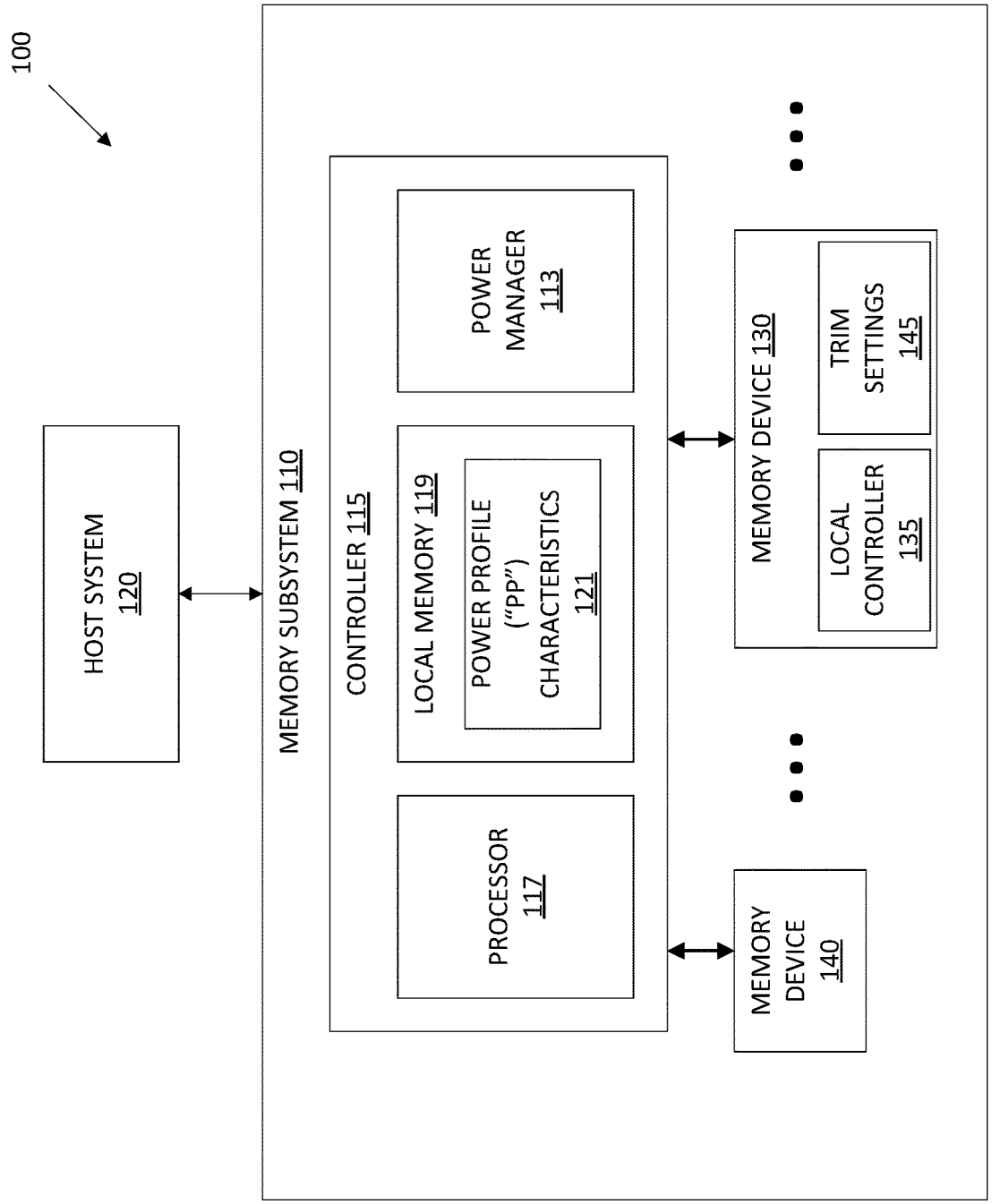
FIG. 1 illustrates an example computing system that includes a memory subsystem in accordance with some embodiments of the present disclosure.

Aspects of the present disclosure are directed to power management in a memory subsystem. A memory sub-system can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The memory devices can include, for example, non-volatile memory devices (e.g., negative- and (NAND)). Other types of memory devices, including volatile memory devices, are described in greater detail below in conjunction with FIG. 1. The host system can provide data to be stored at the memory subsystem and can request data to be retrieved from the memory subsystem.

In various memory subsystem designs, the memory subsystem operates within a fixed power budget (e.g., in terms of peak power consumption, peak current draw, etc.). Depending on the application, a designer can select a memory subsystem for use with a host system based on the specifications of the memory subsystem and the characteristics of the power supply that will be powering the memory subsystem (whether shared or independent of the power supply of the host system). For example, a designer of a mobile device system that operates using a battery power source may select a memory subsystem that operates within a lower power budget than a designer of a high-performance workstation or server system that operates using a wall power source. Memory subsystems employ power management techniques to optimize the operation of the memory subsystem within its advertised power budget. Some memory subsystems employ a decentralized approach to power management. Under such a decentralized approach, the memory devices (e.g., NAND) include a mechanism (e.g., a clock and data bus) through which to communicate with one another in order to ensure the memory subsystem operates within the power budget. For example, several memory devices may negotiate that some subset thereof can operate in a high-power mode while the remaining memory devices operate in a low-power mode. Such a decentralized approach has several disadvantages, including the need for the mechanism through which the memory devices communicate power usage information and the additional delay introduced when the memory devices collectively negotiate their operating modes. Other disadvantages of a decentralized approach include the possible need to change all of the memory devices to change the power management scheme to ensure compatibility, and the inability to efficiently access global information such as memory subsystem workload, aggregate memory device utilization, and/or quality-of-service requirements, that are otherwise available to a centralized controller.

Aspects of the present disclosure address the above and other deficiencies by centralizing memory subsystem power management decisions within a controller of the memory subsystem. In doing so, the need for a mechanism through which the memory devices can communicate amongst each other to manage power is eliminated, reducing the complexity and cost of the memory devices. Additionally, by eliminating the mechanism, dependencies of power management schemes on particular implementations of the mechanism are no longer memory device specific, allowing greater flexibility in adjusting the power management of the memory subsystem even with mismatched memory devices. For example, the centralized approach allows greater power management scheme or policy configurability. The memory subsystem power consumption can be adjusted based on numerous factors such as target market, instantaneous or detected workloads, and/or the number of memory devices or dice in the memory subsystem. Furthermore, the memory subsystem can exhibit improved performance by eliminating the delay associated with operating mode negotiation under the decentralized approach and utilizing additional information to make better decisions regarding the power management of the memory subsystem.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access the memory components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), dynamic random access memory (DRAM), and synchronous dynamic random access memory (SDRAM).

Some examples of non-volatile memory devices (e.g., memory device 130) include negative- and (NAND) flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLC) can store one bit per cell. Other types of memory cells, such as multi-level cells (MLCs), triple-level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative- or (NOR) flash memory, and electrically erasable programmable read-only memory (EEPROM).

The memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem).

In general, the memory subsystem controller 115 can receive commands or operations from the host system 120 (e.g., read and write commands) and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a power manager component 113 ("power manager") that can regulate the power consumption of the memory subsystem 110. In some embodiments, the controller 115 includes at least a portion of the power manager 113. For example, the controller 115 can include an integrated circuit and/or a processor 117 (processing device) configured to execute instructions stored in local memory 119 for performing the operations described herein. In some embodiments, the power manager 113 is part of the host system 110, an application, or an operating system. In some embodiments, the memory devices 130 can be managed memory devices (e.g., managed NAND), which is a raw memory device combined with a local controller 135 for memory management within the same memory device package.

The power manager 113 can adjust the power consumed by memory components while performing various memory operations (e.g., read or write; erase for flash-based media; etc.). To do so, each type of operation can have one or more sets of trim settings. Exemplary trim characteristics include clock rates, capacitor charge rates, etc. A given set of trim settings can control how much power the operation consumes. For example, a write operation (sometimes referred to as a program operation) can have a high power, medium power, and low power trim settings. As is often the case, the higher the power consumption the higher the performance of the operation, so there is a power vs. performance tradeoff.

Each set of trim settings can be associated with a power profile ("PP") identifier. The PP identifier and associated trim settings 145 can be stored in a memory local to each memory device 130. The following table is illustrative.

| PP Identifier | Trim Setting A | . . . | Trim Setting N |
|---|---|---|---|
| PP_0 | A0 | . . . | N0 |
| PP_1 | A1 | . . . | N1 |
| PP_2 | A2 | . . . | N2 |
| . | . | . | . |
| . | . | . | . |
| . | . | . | . |

As shown above, a PP identifier PP_0 has a trim setting A0 for Trim Setting A and a trim setting N0 for trim setting N0, where N is some number of trim settings that are adjusted. In some embodiments, the local controller 135 of a given memory device 130 can access the memory containing the trim settings to configure the memory device 130 to perform an operation using the trim settings associated with a PP identifier sent by the power manager 113.

The power manager 113 can send a PP identifier to a memory device 130 (e.g., to the local controller 135 of the memory device 130) to control which set of trim settings are used while carrying out one or more operations. For example, the power manager 113 can send PP identifier PP_0 to a memory device 130 to cause the memory device 130 to use trim settings A0 through N0.

To manage the power usage of the memory subsystem 110, the power manager 113 has access to PP characteristics 121 stored in a memory (e.g., such as the local memory 119, as illustrated). The PP characteristics 121 represent the performance and power characteristics for a given set of trim settings. An exemplary set of PP characteristics 121 is illustrated in the following table.

| PP Identifier | Power | Latency |
|---|---|---|
| PP_0 | A0 | T0 |
| PP_1 | A1 | T1 |

| PP Identifier | Power | Latency |
| --- | --- | --- |
| PP_2 | A2 | T2 |
| . | . | . |
| . | . | . |
| . | . | . |

Note that the power and latency characteristics for a given set of trim setting as specified by a PP identifier can be characterized during the design and test phase of media 130. Such characterization may be a "worst-case" characterization as is often some variance in the latency and power characteristics even when performing the exact same operation on different memory devices 130 or even on the same memory device 130.

The latency characteristics for a given operation can vary depending on the amount of data involved. For example, a read operation of a small amount of data likely takes less time than a read operation of a large amount of data. Accordingly, the latency characteristic for a given PP can be a function of an amount of data. As a result, the power manager 113 can predict when operations will complete based on the amount of data being accessed, the type of operation, and when the operation was sent to a memory device 130. In other embodiments, the memory device 130 can signal to the controller 115 upon completion of an operation. The power manager 113 can use that signal to determine when operations complete.

The power characteristics for a given operation can vary over the course of the operation. For example, a write operation can have a multi-phase PP where an initial phase has a first power requirement, a subsequent phase has a second power requirement, and a final phase has a third power requirement. The PP characteristics 121 can break down the power requirements for each phase in such situations. Note that in some embodiments, the power requirement is characterized by current draw.

To provide a simple example of power management, assume a simple memory subsystem includes two memory devices 130 and has a power budget of 10. A read operation for the first memory device using a default PP might have a power requirement of 3, and a write operation for the second memory device using a default PP might have a power consumption of 8. As a result, both the read and the write operation could not be executed concurrently using the default PPs without meeting (e.g., exceeding) the power budget. To allow for concurrent operation (and likely an improvement in system performance), the power manager 113 can adjust the PP of one or both operations to use a PP with a lower power characteristic. For example, the power manager 113 can change the write operation to the second memory device to use a different PP with a power consumption of 7, thereby allowing at least a portion of both the read and write operations to be performed concurrently.

Further details with regards to the operations of the power manager 113 are described below.

Figure 2:
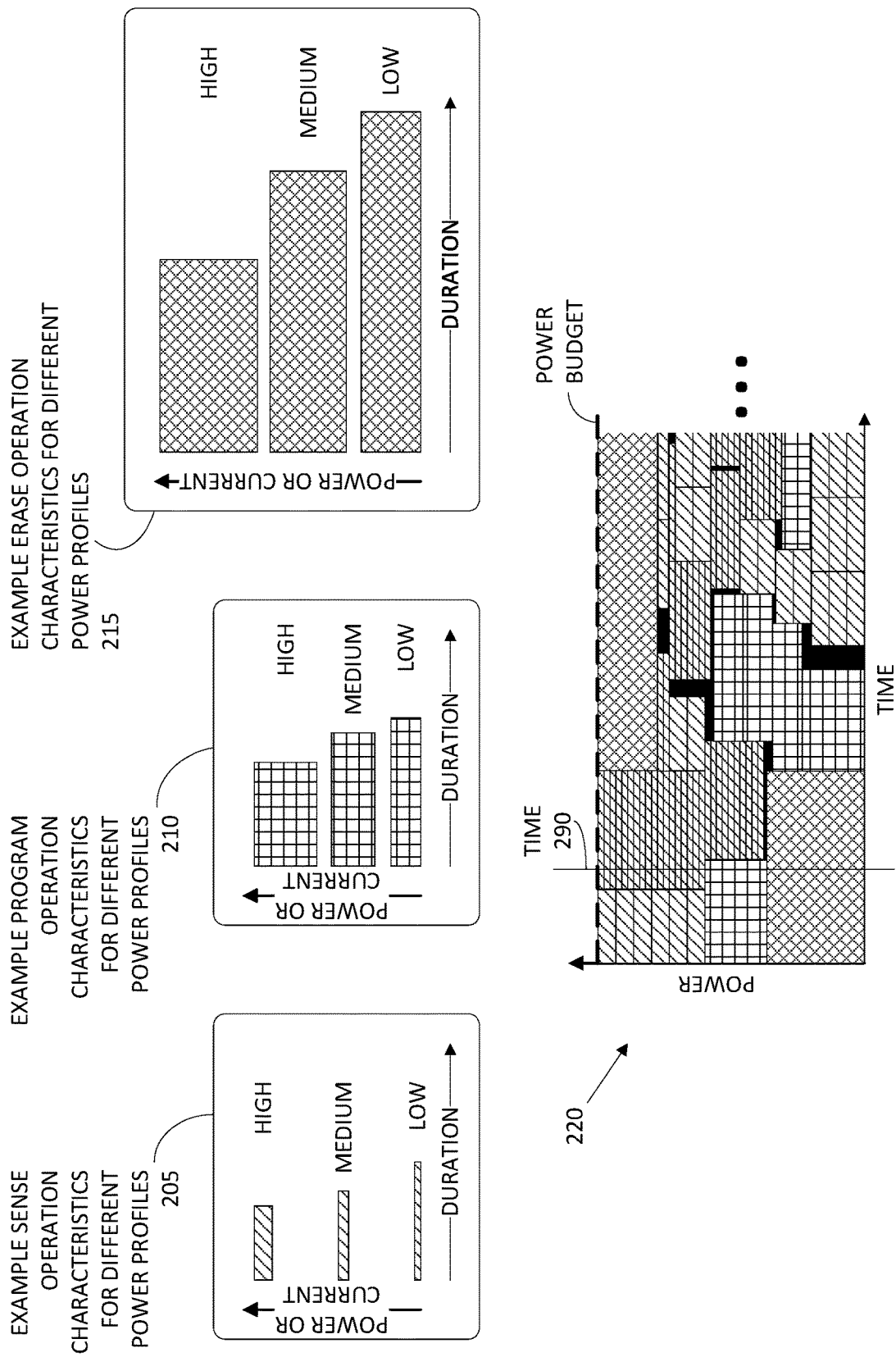
FIG. 2 conceptually illustrates a power management scheme in accordance with some embodiments of the present disclosure.

FIG. 2 conceptually illustrates a power management scheme in accordance with some embodiments of the present disclosure. Illustrated at the top of the figure are blocks representative of the PP characteristics for various operation types at different PPs. Operation characteristics 205 are illustrated for sense (or read) operations using diagonally slashed blocks. Operation characteristics 210 are illustrated for program (or write) operations using square gridded blocks. Operation characteristics 215 are illustrated for erase operations (if so required by the media) using diamond gridded blocks. In general, the "high" PP blocks illustrate higher power (or current) requirements and decreased latency relative to the "medium" PP blocks, which in turn illustrate higher power requirements and decreased latency relative to the "low" PP blocks. For example and with reference to the above example set of PP characteristics 121, if the identifier PP_0 identifies the "high" PP for sense operations, the identifier PP_1 identifies the "medium" PP for sense operations, and the identifier PP_2 identifies the "low" PP for sense operations, then A0>A1>A2 and T0<T1<T2.

Illustrated at the bottom of the figure is a plot of power consumption over time showing how the varying PPs for different types of enqueued operations can be used to improve the performance of the memory subsystem within the power budget. The horizontal axis is the operation of the memory subsystem over time while the vertical axis illustrates the power usage. Note that in this simplified plot, the amount of memory being accessed is assumed to be constant across operations types (e.g., all reads access 4 kilobytes), the power consumption over the duration of an operation is constant (e.g., not multiphase as described above), and the number and identity of memory devices in the memory subsystem is ignored (e.g., which memory devices are performing the operations is not shown).

As shown at time 290, the memory subsystem is concurrently carrying out eighteen low PP sense operations, a high PP program operation, and a high PP erase operation. Given the imminent completion of the program operation and, assuming that numerous sense operations are queued, the power manager 113 can set the PP associated with those enqueued operations to allow them to proceed a short time later (where the ten additional low PP sense operations begin after time 290). Various techniques can be used to effectuate the adjustment of PPs to improve performance of the memory subsystem given a power budget.

Figure 3:
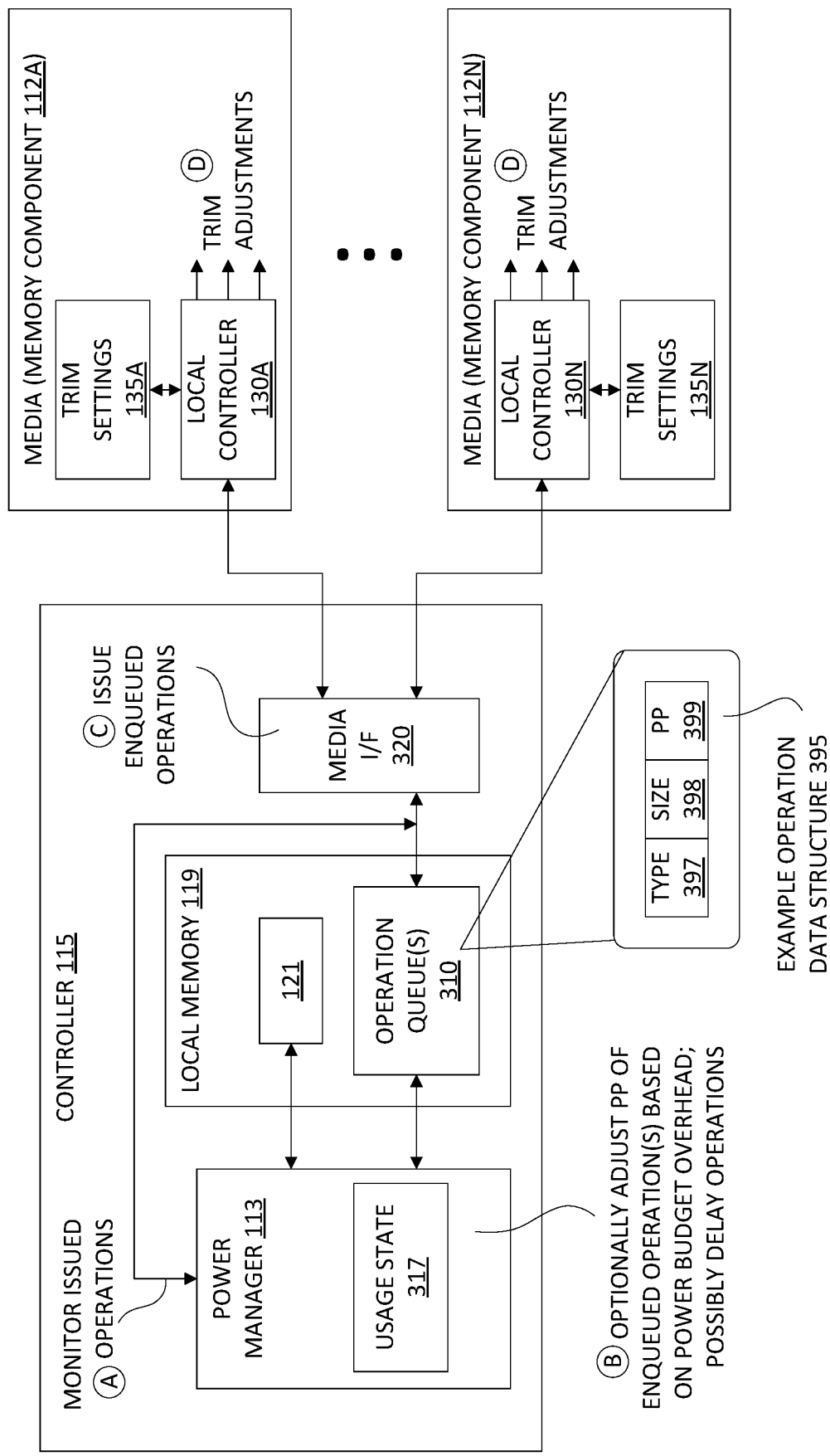
FIG. 3 illustrates an exemplary power management technique in accordance with some embodiments of the present disclosure.

FIG. 3 illustrates an exemplary power management technique in accordance with some embodiments of the present disclosure. As illustrated, the controller 115 includes the local memory 119 including one or more operation queues 310, the power manager 113, and a media interface ("I/F") 320. The one or more operation queues 310 can be implemented as a single queue for all pending operations, separate queues for separate memory devices 130, or as multiple queues per memory device 130 (e.g., for operations with varying levels of priority). An exemplary data structure 395 illustrates at least a portion of an operation entry in a queue. As shown, the data structure includes an operation type 397 (e.g., sense, program, or erase), an operation size 398 (to indicate the amount of data to be read, written, or erased), and a PP identifier 399 that indicates the power profile associated with the operation. In some embodiments, another component of the controller 115 that adds operations to the queue(s) 310 can assign each added operation a default PP identifier.

With reference to the encircled letters A through D in FIG. 3, the following paragraphs describe how a centralized power management scheme can regulate power consumption according to some embodiments.

As indicated at circle A, the power manager 113 monitors operations dispatched to the media. Based on those dispatched operations, the power manager 113 estimates a state of power usage 317 based on the PP characteristics 121 of those dispatched operations. Such an estimation can be based on the latency characteristic of previously dispatched operations—e.g., if a read operation was dispatched at time t and the latency characteristic for the size of the operation indicated the operation would take time $\Delta t$, the power manager 113 can determine that the power usage for that read operation will cease at time $t+\Delta t$. In this manner, the power manager 113 can predict the future state of power usage given the timing of previously dispatched operations and their latency characteristics. Note that in embodiments that rely on a feedback signal from the memory device(s) 130 to indicate when an operation completes, the power manager 113 can re-calculate the state of power usage 317 upon receipt of such signals.

As indicated at circle B, the power manager 113 optionally adjusts the PP identifiers 399 associated with enqueued operations given the state of power usage 317 and a power budget. The power manager 113 can obtain the power budget from a local memory such as the local memory 119 (e.g., in cases where the power budget was programmed during manufacture) or from the host system 120 (e.g., in cases where the power budget is adjustable in the field).

According to some embodiments, the power manager 113 adjusts the PP identifiers 399 associated with enqueued operations based a power budget overhead. The power manager 113 determines the power budget overhead (if any) based on the difference between the power budget and the state of power usage 317. Note that the state of power usage 317 can be based upon a future state of power usage after completion of one of the previously dispatched operations. For example and with reference to FIG. 2, the power manager 113 can calculate the power budget overhead at time 290 to estimate the power budget overhead at a later time, such as upon the completion of the high PP program operation. The power budget overhead at that later time can be estimated by summing the power characteristic of each of the dispatched operations that will continue beyond the completion of the high PP program operation. If the power budget is not fully utilized, the power manager 113 can calculate the power budget overhead at the current time given the state of dispatched operations. In either case, the power manager 113 then adjusts up or down the PP identifiers associated with upcoming operations that will be dispatched from the queue(s) 310 to fit those enqueued operations within the calculated power budget overhead. For example, if few operations are enqueued and there is a large power budget overhead, the power manager 113 can adjust the PP identifiers of the dispatched operations for improved performance. Conversely, if a large number of operations are enqueued and there is a small power budget overhead, the power manager 113 can adjust the PP identifiers of the dispatched operations for reduced power consumption. Again, by example and with reference to FIG. 2, the power manager 113 can change the PP identifiers of the ten enqueued sense operations to use a low PP setting to allow those operations to proceed upon completion of the high PP program operation.

As indicated at circle C, the media interface 320 reads operations from the operations queue 310 and issues those operations to the memory devices 130. In some embodiments, the media interface communicates with the memory devices 130 via an interface such as the one specified in the Open NAND Flash Interface Specification ("ONFI").

In some cases, the power manager 113 can delay operations if the power budget would be met or exceeded even under the lowest power consumption PP. For example, the power manager 113 can set a flag in the data structure 395 associated with an enqueued operation that, when set, causes the media interface to not dispatch that operation.

As indicated at circle D, upon receipt of an operation, the memory device 130 carries out the operation according to the PP identifier associated with the operation. The memory device 130 or the local controller 135 carries out the operation by accessing the set of trim settings 145 associated with the specified PP and adjusting the trim of the memory device accordingly.

In some embodiments, the power manager 113 avoids the need to estimate the state of the power usage (or augments the estimated state of power usage) by using power usage feedback. For example, if the memory subsystem 110 provides a sensor to measure power consumption, the power manager 113 can monitor power consumption directly rather than through inference using the PP characteristics 121. Various power sensing techniques can be used, such as an in-line low-ohmic resistor on the power supply to generate a voltage delta indicative of instantaneous current usage.

Figure 4:
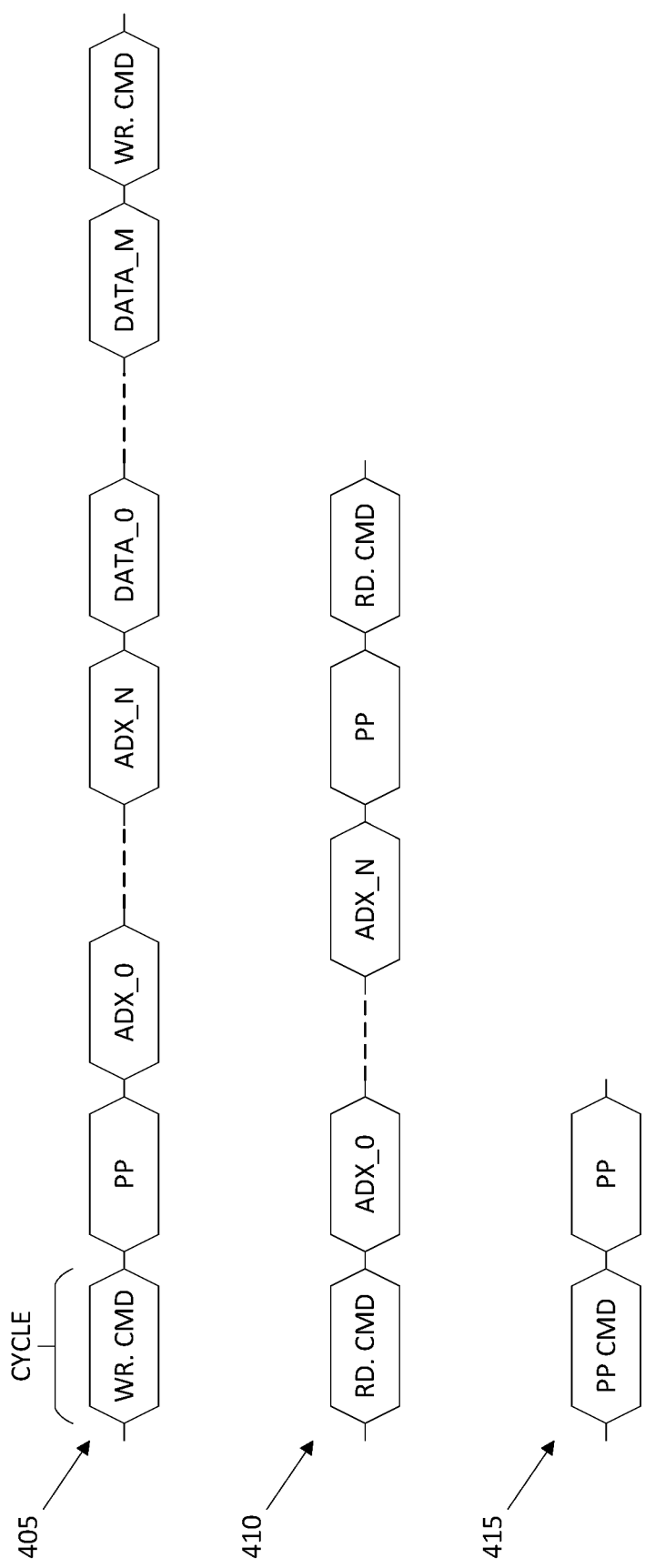
FIG. 4 illustrates exemplary power management commands in accordance with some embodiments of the present disclosure.

FIG. 4 illustrates exemplary power management commands in accordance with some embodiments of the present disclosure. As mentioned above, the media interface 320 can implement an interface to issue commands (or operations) to the memory devices 130, such as ONFI. Under ONFI, each operation is composed of one or more cycles on the bus or other type of communications channel between the controller 115 and the memory devices 130. To facilitate the introduction of PP selection, the PP identifier can be transmitted as an additional cycle in read (sense) or write (program) operations at some point in the command structure. For example, exemplary command 405 shows a write operation with a first write command word cycle, a PP identifier cycle, a number of address cycles, a number of data cycles, and a second write command word cycle. Note that the PP identifier cycle can be inserted anywhere within the command, such as before or after the addressing or data cycles. As another example, exemplary command 410 shows a read operation with a first read command word cycle, a number of address cycles, a PP identifier cycle, and a second read command word cycle. Again, the PP identifier cycle can be inserted anywhere within the command.

Exemplary command 415 shows a PP update operation with a PP command word cycle and a PP identifier cycle. Command 415 can be used to change the default trim settings for future commands. For example, the controller 115 can issue a PP command using command 415 to update the trim settings for a given memory device 130 such that subsequent operations are performed using those trim settings, thereby avoiding the need to include a PP identifier cycle with each command. In such embodiments with memory devices 130 that maintain a PP state, the power manager 113 can track the last PP identifier issued to each memory device 130. The power manager 113 use the PP characteristic of the last-issued PP identifier to estimate whether the dispatch of an enqueued operation using the associated trim settings will meet the power budget.

Figure 5:
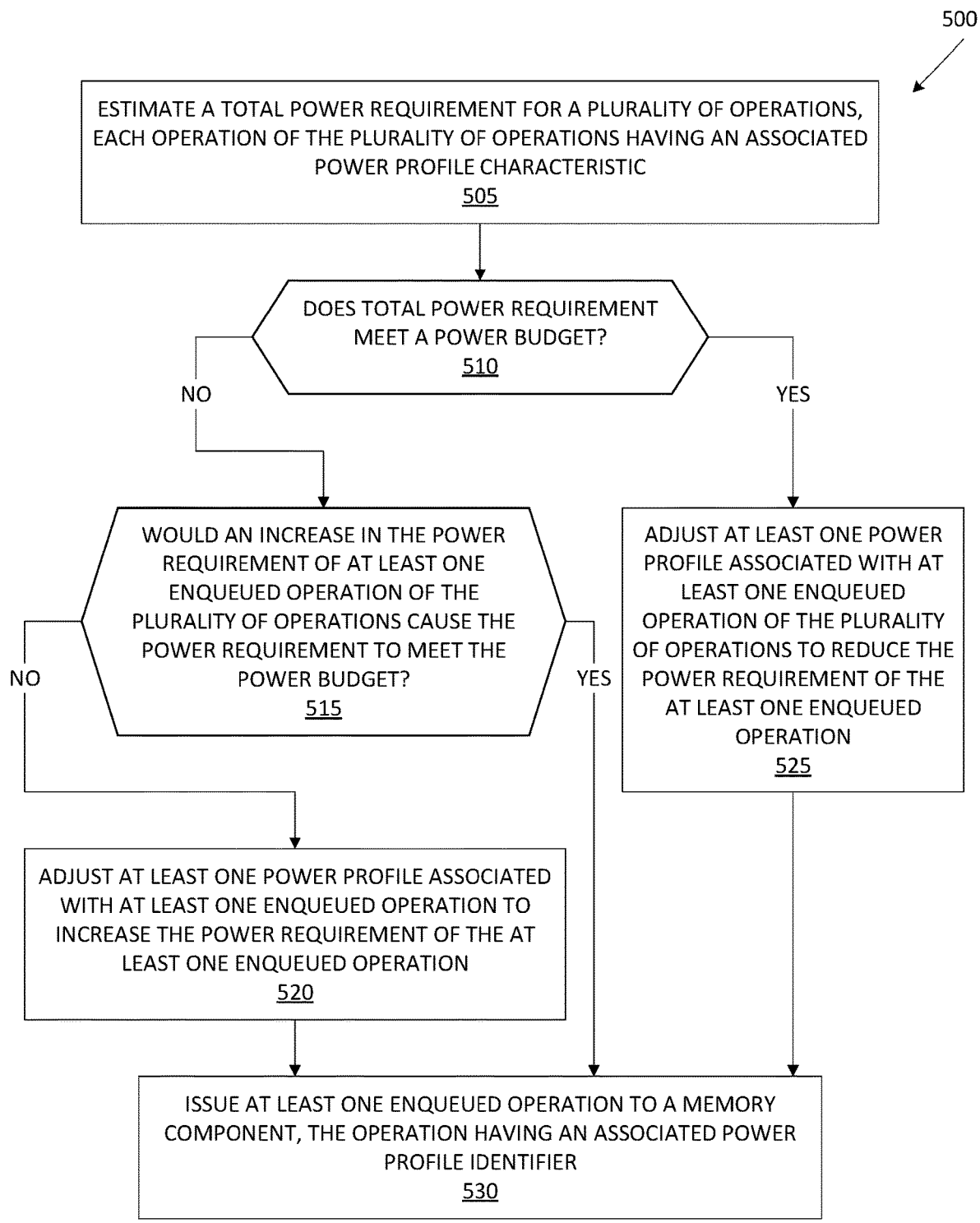
FIG. 5 is a flow diagram of an example method to manage power in accordance with some embodiments of the present disclosure.

FIG. 5 is a flow diagram of an example method to manage power in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the power manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device estimates a total power requirement for a plurality of operations, each operation of the plurality of operations having an associated power profile characteristic. As described above, the power manager 113 can maintain a state of power usage 317 by tracking dispatched operations given the PP assigned when they were dispatched (e.g., by maintaining a sum of each dispatched operation's power requirement and adjusted over time based on each dispatched operation's duration). Additionally, the power manager 113 can estimate the power budget overhead at the current point in time (e.g., if not all of the budget is used) or at a future point in time (e.g., when all of the budget currently is used and one or more dispatched operations will soon complete).

At operation 510, the processing device checks whether the total power requirement meets a power budget. For example, the power manager 113 can add in the power requirement of one or more enqueued operations that are next to be dispatched to the estimated total power requirement to determine whether the power budget would be met by both any previously dispatched operations still being performed and by the newly dispatched operations from a queue. In some embodiments, the power manager 113 uses a "default" PP identifier when estimating the additional power requirement that the enqueued operations that are next to be dispatched will add to the state of power usage 317. If the total power requirement meets the power budget, the method 500 proceeds to operation 525, described below. If the total power requirement does not meet the power budget, the method 500 proceeds to operation 515.

At operation 515, the processing device checks whether an increase in the power requirement of at least one enqueued operation of the plurality of operations would cause the power requirement to meet the power budget. Here, because the total power requirement did not meet the power budget, the power manager 113 may be able to increase the performance of one or more of the enqueued operations that are next to be dispatched. For example, if the overhead (amount of the power budget that would be unused) is "1" unit of power from operation 510, but the minimum increase in performance of one of the enqueued operations requires "2" units of power, the power manager 113 is unable to modify the PP for the enqueued operation(s). Conversely, if the overhead is "10" units of power from operation 510 and the minimum increase in performance of one of the enqueued operations requires "2" units of power, the power manager 113 is able to modify the PP for the enqueued operation(s). If an increase in the power requirement of at least one enqueued operation of the plurality of operations would cause the power requirement to meet the power budget, the method 500 proceeds to operation 530, described below. If an increase in the power requirement of at least one enqueued operation of the plurality of operations would not cause the power requirement to meet the power budget, the method 500 proceeds to operation 520.

At operation 520, the processing device adjusts at least one power profile associated with at least one enqueued operation to increase the power requirement of the at least one enqueued operation. Here, the power manager 113 can identify one or more PP modifications to make to the enqueued operations by optimizing the usage of the power budget overhead. Based on the identified modifications, the power manager 113 can modify the PP identifier(s) 399 associated with one or more of the enqueued operations to adjust how much power those operations will require during processing. For example, the power manager 113 can downgrade operations based upon one or more of: a priority value assigned to the operation, operation type, source of the operation, and a run-time length for an operation. Downgrades can include one or more a reduced power profile or power profile characteristic for an operation, delaying the performance of an operation, etc. Using operation types as an example, the power manager 113 can downgrade read operations first, write operations second, and erase operations third. In one embodiment, the power manager 113 downgrades internal memory system operations prior to host operations (e.g., downgrading system reads prior to downgrading host reads). In an alternate embodiment, the power manager 113 downgrades host operations prior to internal memory system operations. In other embodiments, the power manager 113 can downgrade operations based upon operation type or source in a round robin approach, using weighted fair queuing, random selection, or another balanced metric scheme.

At operation 525, the processing device adjusts at least one power profile associated with at least one enqueued operation of the plurality of operations to reduce the power requirement of the at least one enqueued operation. As in operation 520, power manager 113 can identify one or more PP modifications to make to the enqueued operations by optimizing the usage of the power budget. Unlike operation 520, in this case the power budget was met, so the power manager adjusts the PP associated with one or more of the enqueued operations to reduce the power requirement, again, e.g., by modifying the PP identifier(s) 399 associated with one or more of the enqueued operations to adjust how much power those operations will require during processing. Note that in some cases, a reduction in the power requirement of the enqueued operations by adjusting the PP may be insufficient to avoid meeting the power budget. In such cases, the power manager 113 can cause a delay in the dispatch of the enqueued operations until one or more previously dispatched operations complete, thereby freeing additional power budget overhead.

At operation 530, the processing device issues at least one enqueued operation to a memory device, the operation having an associated power profile identifier. For example, if the method 500 reached operation 530 via operation 515, the media interface 320 can dispatch an enqueued operation to a memory device and provide the memory device a "default" PP identifier. As another example, if the method 500 reached operation 530 via operation 520, the media interface 320 can dispatch an enqueued operation to a memory device and provide the memory device a PP identifier that will cause the memory device to perform the enqueued operation with an increased level of performance. Finally, if the method 500 reached operation 530 via operation 525, the media interface 320 can dispatch an enqueued operation to a memory device and provide the memory device a PP identifier that will cause the memory device to perform the enqueued operation with a decreased level of performance, for example. Again, as noted for operation 525, if a reduction in the power requirement of an operation via a changed PP was insufficient to adhere to the power budget, the power manager 113 can cause the media interface 320 to defer dispatching an enqueued operation. In such cases, the media interface 320 can dispatch enqueued operations upon completion of other, previously dispatched operations.

Figure 6:
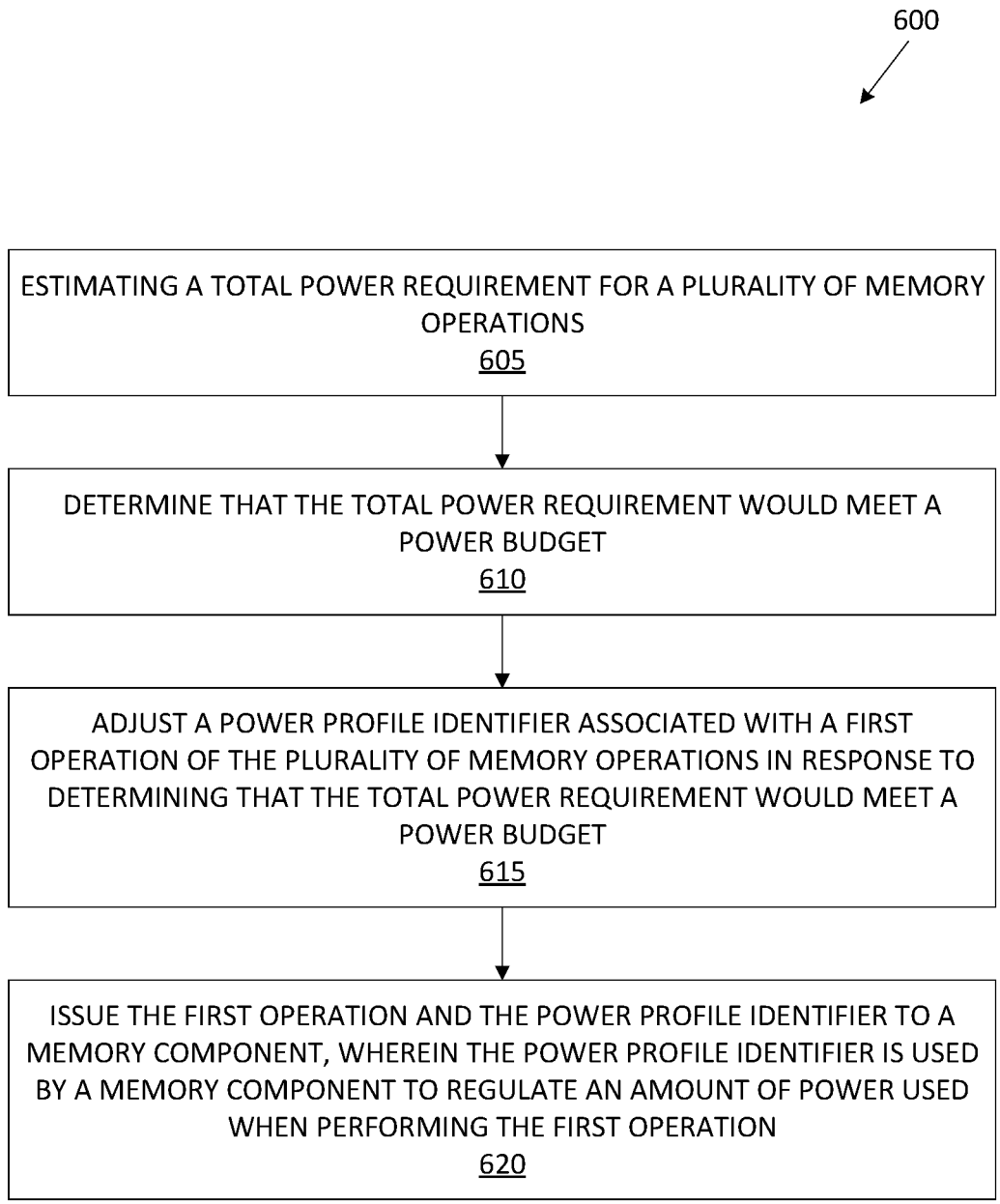
FIG. 6 is a flow diagram of another example method to manage power in accordance with some embodiments of the present disclosure.

FIG. 6 is a flow diagram of another example method to manage power in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the power manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device estimates a total power requirement for a plurality of memory operations. For example, the power manager 113 can sum the power requirement of any previously dispatched operations (e.g., based on the PP characteristic(s) of those dispatched operations) that a memory device is still processing and the power requirement of one or more enqueued operations (e.g., based on the PP characteristic(s) of those enqueued operations). Such an estimation can occur as described with reference to operation 505, above.

At operation 610, the processing device determines that the total power requirement would meet a power budget. As described above, the power manager 113 can obtain the power budget for the memory subsystem from a memory that was programmed during manufacture, the host system, etc. The power manager 113 can compare the estimated total power requirement against the power budget to determine whether the power budget would be met.

At operation 615, the processing device adjusts a power profile identifier associated with a first operation of the plurality of memory operations in response to determining that the total power requirement would meet a power budget. Assuming the additional processing of one or more enqueued operations to the previously dispatched operations still in work would meet the power budget, the power manager 113 can adjust the PP to be used with the enqueued operation to reduce the power requirement of that operations. For example, the power manager 113 can adjust the PP to be used with a sense operation from the medium characteristic to the low characteristic by adjusting the PP identifier associated with the enqueued operation. Such an adjustment can occur as described with reference to operation 525, above.

At operation 620, the processing device issues the first operation and the power profile identifier to a memory device, wherein the power profile identifier is used by a memory device to regulate an amount of power used when performing the first operation. For example, the media interface 320 can dispatch the operation to the memory device with the adjusted PP identifier (e.g., with command 410 with the adjusted PP identifier or by first issuing a command 415 with the adjusted PP identifier followed by a read command). Such an issuance can occur as described with reference to operation 530, above.

Figure 7:
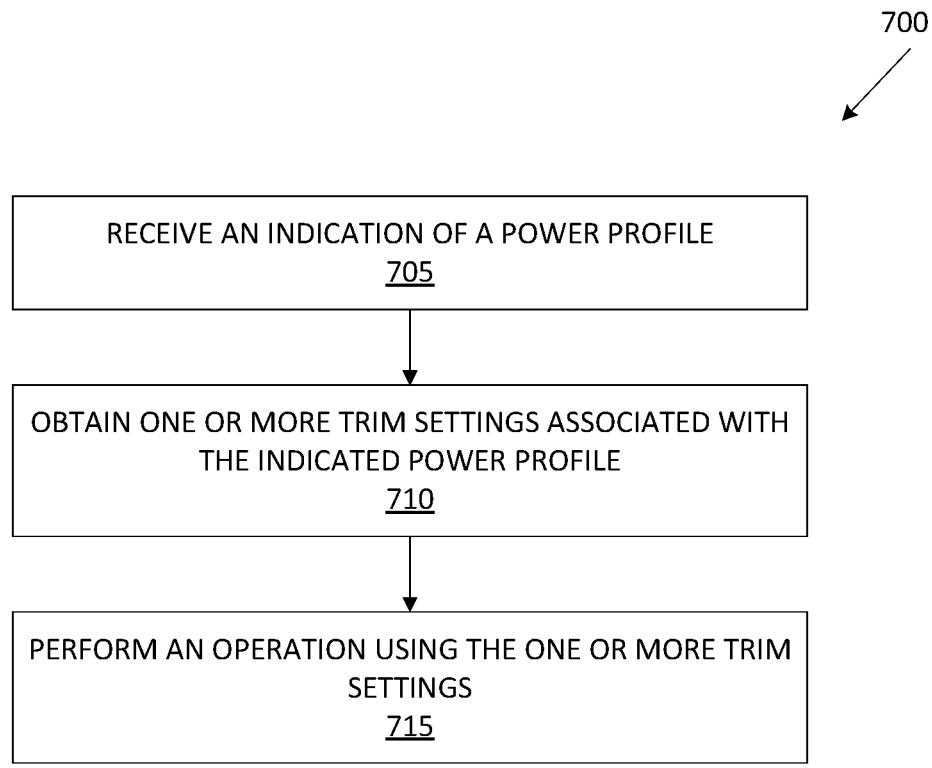
FIG. 7 is a flow diagram of an example method to adjust power consumption in accordance with some embodiments of the present disclosure.

FIG. 7 is a flow diagram of an example method to adjust power consumption in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the local controller 135 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, the processing device receives an indication of a power profile. For example, the local controller 135 can receive a command such as command 405, 410, or 415 that includes a PP identifier. At operation 710, the processing device obtains one or more trim settings associated with the indicated power profile. For example, the local controller 135 can fetch the trim settings associated with a PP identifier from a lookup table stored in a local non-volatile memory (e.g., one that was programmed during manufacture). At operation 715, the processing device performs an operation using the one or more trim settings. For example, the local controller 135 can access the associated memory device to perform an operation (e.g., read, write, erase) using the trim settings identified by the PP identifier.

Figure 8:
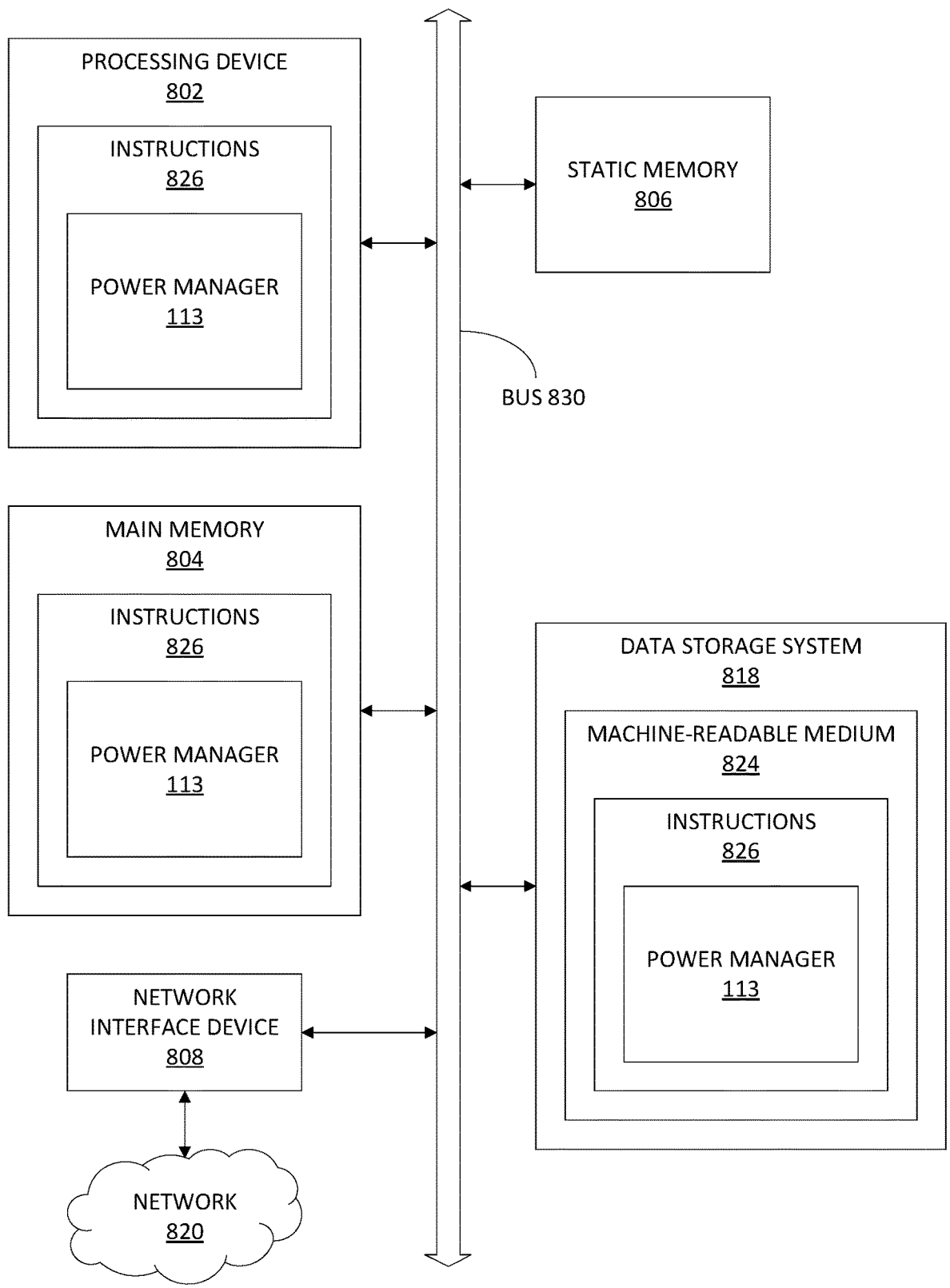
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the power manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory subsystem 110 of FIG. 1.

In one embodiment, the instructions 826 include instructions to implement functionality corresponding to a power manager (e.g., the power manager 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 500 and 600 in response to its processor executing a computer program (e.g., a sequence of instructions) contained in a memory or other non-transitory machine-readable storage medium. As another example, a computer system or other data processing system, such as the local controller 135, may carry out the computer-implemented method 700 in response to its processor executing a computer program (e.g., a sequence of instructions) contained in a memory or other non-transitory machine-readable storage medium.

Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   estimating a total power requirement for a plurality of memory operations;
   determining if the total power requirement would meet a power budget;

adjusting a power profile identifier for a first operation of the plurality of memory operations in response to determining if the total power requirement meets the power budget,
  wherein adjusting the power profile for the first operation reduces a power requirement of the first operation when the total power requirement meets the power budget; and
  wherein adjusting the power profile for the first operation increases the power requirement of the first operation when the total power requirement does not meet the power budget; and
issuing the first operation and the power profile identifier to a memory device, wherein the power profile identifier is used by the memory device to regulate an amount of power used when performing the first operation.

2. The method of claim 1:
wherein the plurality of memory operations includes a first set of one or more memory operations previously dispatched to one or more memory devices and a second set of one or more memory operations enqueued for dispatch to the one or more memory devices, and
wherein the first operation is included in the second set.

3. The method of claim 1:
wherein each operation of the plurality of memory operations has an associated power profile characteristic that indicates a power requirement of the operation; and
wherein estimating the total power requirement comprises summing the power requirement of each of the plurality of memory operations based on the indicated power requirements.

4. The method of claim 3, wherein the power profile characteristic of each of the plurality of memory operations further indicates an operation duration.

5. The method of claim 1, wherein the first operation and the power profile identifier are issued to the memory device in separate commands.

6. The method of claim 1, wherein the power profile identifier is associated with a set of trim settings that include a clock rate setting.

7. The method of claim 1, wherein the power profile identifier is one of a plurality of power profile identifiers, each power profile identifier of the plurality of power profile identifiers having a different power characteristic than the other power profile identifiers in the plurality of power profile identifiers.

8. A non-transitory computer-readable storage medium comprising instructions that, when executed by a processing device, cause the processing device to:
  estimate a total power requirement for a plurality of memory operations;
  determine if the total power requirement would meet a power budget;
  adjust a power profile identifier for a first operation of the plurality of memory operations in response to determining if the total power requirement meets the power budget,
  wherein adjusting the power profile for the first operation reduces a power requirement of the first operation when the total power requirement meets the power budget; and
  wherein adjusting the power profile for the first operation increases the power requirement of the first operation when the total power requirement does not meet the power budget; and
  issue the first operation and the power profile identifier to a memory device, wherein the power profile identifier is used by the memory device to regulate an amount of power used when performing the first operation.

9. The non-transitory computer-readable storage medium of claim 8:
wherein the plurality of memory operations includes a first set of one or more memory operations previously dispatched to one or more memory devices and a second set of one or more memory operations enqueued for dispatch to the one or more memory devices, and
wherein the first operation is included in the second set.

10. The non-transitory computer-readable storage medium of claim 8:
wherein each operation of the plurality of memory operations has an associated power profile characteristic that indicates a power requirement of the operation; and
wherein estimating the total power requirement comprises summing the power requirement of each of the plurality of memory operations based on the indicated power requirements.

11. The non-transitory computer-readable storage medium of claim 10, wherein the power profile characteristic of each of the plurality of memory operations further indicates an operation duration.

12. The non-transitory computer-readable storage medium of claim 8, wherein the first operation and the power profile identifier are issued to the memory device in separate commands.

13. The non-transitory computer-readable storage medium of claim 8, wherein the power profile identifier is associated with a set of trim settings that include a clock rate setting.

14. The non-transitory computer-readable storage medium of claim 8, wherein the power profile identifier is one of a plurality of power profile identifiers, each power profile identifier of the plurality of power profile identifiers having a different power characteristic than the other power profile identifiers in the plurality of power profile identifiers.

15. A system comprising:
a memory device; and
a processing device, operatively coupled with the memory device, to:
  estimate a total power requirement for a plurality of memory operations;
  determine if the total power requirement would meet a power budget;
  adjust a power profile identifier for a first operation of the plurality of memory operations in response to determining if the total power requirement meets the power budget,
  wherein adjusting the power profile for the first operation reduces a power requirement of the first operation when the total power requirement meets the power budget; and
  wherein adjusting the power profile for the first operation increases the power requirement of the first operation when the total power requirement does not meet the power budget; and
  issue the first operation and the power profile identifier to the memory device, wherein the power profile identifier is used by the memory device to set one or more trim settings for use when performing the first operation.

16. The system of claim 15, wherein:
wherein the plurality of memory operations includes a first set of one or more memory operations previously dispatched to one or more memory devices and a second set of one or more memory operations enqueued for dispatch to the one or more memory devices, and wherein the first operation is included in the second set.

17. The system of claim 15:
wherein each operation of the plurality of memory operations has an associated power profile characteristic that indicates a power requirement of the operation; and
wherein estimating the total power requirement comprises summing the power requirement of each of the plurality of memory operations based on the indicated power requirements.

18. The system of claim 17, wherein the power profile characteristic of each of the plurality of memory operations further indicates an operation duration.

19. The system of claim 15, wherein the first operation and the power profile identifier are issued to the memory device in separate commands.

20. The system of claim 15, wherein the power profile identifier is one of a plurality of power profile identifiers, each power profile identifier of the plurality of power profile identifiers having a different power characteristic than the other power profile identifiers in the plurality of power profile identifiers.

* * * * *